(12) United States Patent
Schmidt

(10) Patent No.: US 11,734,357 B2
(45) Date of Patent: Aug. 22, 2023

(54) SYSTEM AND METHODS FOR DATA SUPPLY, VERIFICATION, MATCHING, AND ACQUISITION

(71) Applicant: Capped Out Media, Taylorsville, UT (US)

(72) Inventor: Waynard Schmidt, West Valley City, UT (US)

(73) Assignee: Capped Out Media, Taylorsville, UT (US)

( * ) Notice: Subject to any disclaimer, the term of this patent is extended or adjusted under 35 U.S.C. 154(b) by 219 days.

(21) Appl. No.: 17/104,056

(22) Filed: Nov. 25, 2020

(65) Prior Publication Data

US 2022/0164390 A1    May 26, 2022

(51) Int. Cl.
*G06F 16/9035* (2019.01)
*G06N 3/08* (2023.01)
*G06F 9/52* (2006.01)
*G06F 16/93* (2019.01)

(52) U.S. Cl.
CPC ........... *G06F 16/9035* (2019.01); *G06F 9/52* (2013.01); *G06F 16/93* (2019.01); *G06N 3/08* (2013.01)

(58) Field of Classification Search
CPC ........ G06F 16/9035; G06F 16/93; G06F 9/52; G06N 3/08
See application file for complete search history.

(56) References Cited

U.S. PATENT DOCUMENTS

| | | | |
|---|---|---|---|
| 9,779,129 B1 * | 10/2017 | Lequeux | G06F 16/24 |
| 10,235,682 B2 * | 3/2019 | Jouhikainen | G06Q 30/0201 |
| 10,395,287 B1 * | 8/2019 | Lowell | G06Q 10/06316 |
| 11,138,249 B1 * | 10/2021 | Tosik | G06F 40/30 |
| 11,410,211 B1 * | 8/2022 | Schutz | H04L 63/10 |
| 2013/0297636 A1 * | 11/2013 | Tsun | G06F 16/24 707/758 |
| 2015/0073929 A1 * | 3/2015 | Psota | G06Q 30/0605 705/26.2 |
| 2016/0239840 A1 * | 8/2016 | Preibisch | G06Q 20/3829 |
| 2019/0095048 A1 * | 3/2019 | Schmidt | G06F 40/174 |
| 2019/0342276 A1 * | 11/2019 | Sherif | H04L 63/08 |
| 2020/0226132 A1 * | 7/2020 | Taylor | G06F 16/958 |
| 2020/0364760 A1 * | 11/2020 | Sabat | G06Q 30/04 |
| 2021/0297461 A1 * | 9/2021 | Athwal | G06Q 20/127 |
| 2021/0334879 A1 * | 10/2021 | Sussman | G06Q 10/087 |
| 2022/0138833 A1 * | 5/2022 | Moore | G06F 16/3344 705/26.7 |

* cited by examiner

Primary Examiner — Robert W Beausoliel, Jr.
Assistant Examiner — Susan F Rayyan
(74) Attorney, Agent, or Firm — Bochner PLLC; Andrew D. Bochner

(57) ABSTRACT

A data supply, verification, matching, and acquisition platform comprising a data supply sub-system and interface, a data verification sub-system, a data matching sub-system, and a data acquisition sub-system and interface, with the data supply sub-system configured to obtain a first type of data, the data verification sub-system configured to verify the first type of data, the data acquisition sub-system configured to obtain a second type of data, and the data matching sub-system configured to match the first type of data with the second type of data and return positive matches to the data acquisition sub-system.

10 Claims, 9 Drawing Sheets

SYSTEM AND METHODS FOR DATA SUPPLY, VERIFICATION, MATCHING, AND ACQUISITION

BACKGROUND

The present invention relates to the field of web-based software. More particularly, the present invention is directed toward facilitating e-commerce customer data transfers.

Transaction systems have migrated to electronic networks, and are the backbone of e-commerce interactions. Over the internet, customers are able to purchase various items and services, such as products, software, entertainment and the like. Products and services may be purchased from large merchants, medium sized merchants or even individuals.

"Lead-generation," the act of identifying and cultivating potential customers, often requires significant investment in time and energy, with yields in single digits. Additionally, in certain industries, especially when facilitated via internet leads, the cost is on a "per click" basis. Current lead generation techniques utilized by many companies merely implement a landing page with a contact form, such as "Contact Us" or the like. This requires manual input of data.

The alternative is to advertise and pay a per-click rate. Yet, this expensive approach not only requires substantial sums invested, it is also not terribly effective. Moreover, many leads are low quality, and not properly matched to the service or product.

It would be desirable, therefore, to provide marketing systems and methods that allow for customer data to be retrieved, uploaded and processed on a third-party system.

It would be further desirable to provide systems and methods for providing premium and highly desirable, high-yield data to advertisers.

Accordingly, systems and methods for matching buyers with high-yield and high-quality lead generation data from advertisers is hereby provided.

SUMMARY OF THE INVENTION

The transactional lead recommendation platform features a lead recommendation engine including an advertiser or seller sub-system and interface, a buyer or purchaser sub-system and interface, and a server sub-system and database. The advertiser sub-system primarily receives, formats, and categorizes visitor information to a website via a pixel. The pixel may detect internet protocol (IP), geolocation, user agent, operating system, referrer, uniform resource identifier (URI) or other undisclosed information, and analyze real-time web traffic data to score against the growing database of leads that have opted into third party marketing efforts to find matches and generate advertising leads.

As used herein, "advertiser" is an entity that offers data or leads for sale, in order to generate potential business for a buyer. As used herein, "buyer" refers to any entity that purchases or seeks leads or generated information in order to secure business or revenue.

The transactional lead recommendation platform includes a buyer sub-system and buyer interface to register a unique identifier, and generate a unique pixel to place on a website associated with the buyer; an advertiser sub-system and advertiser interface to upload data; a receiver, transmitter, database and processor configured to: retrieve the pixel on the buyer sub-system; receive real-time web-traffic, including logging visitors to the website, their IP addresses, and various data, process, using the processor, the logged information, store in the database, and compare to a pre-existing set of records in the database, and offer matching leads.

Figure 1:
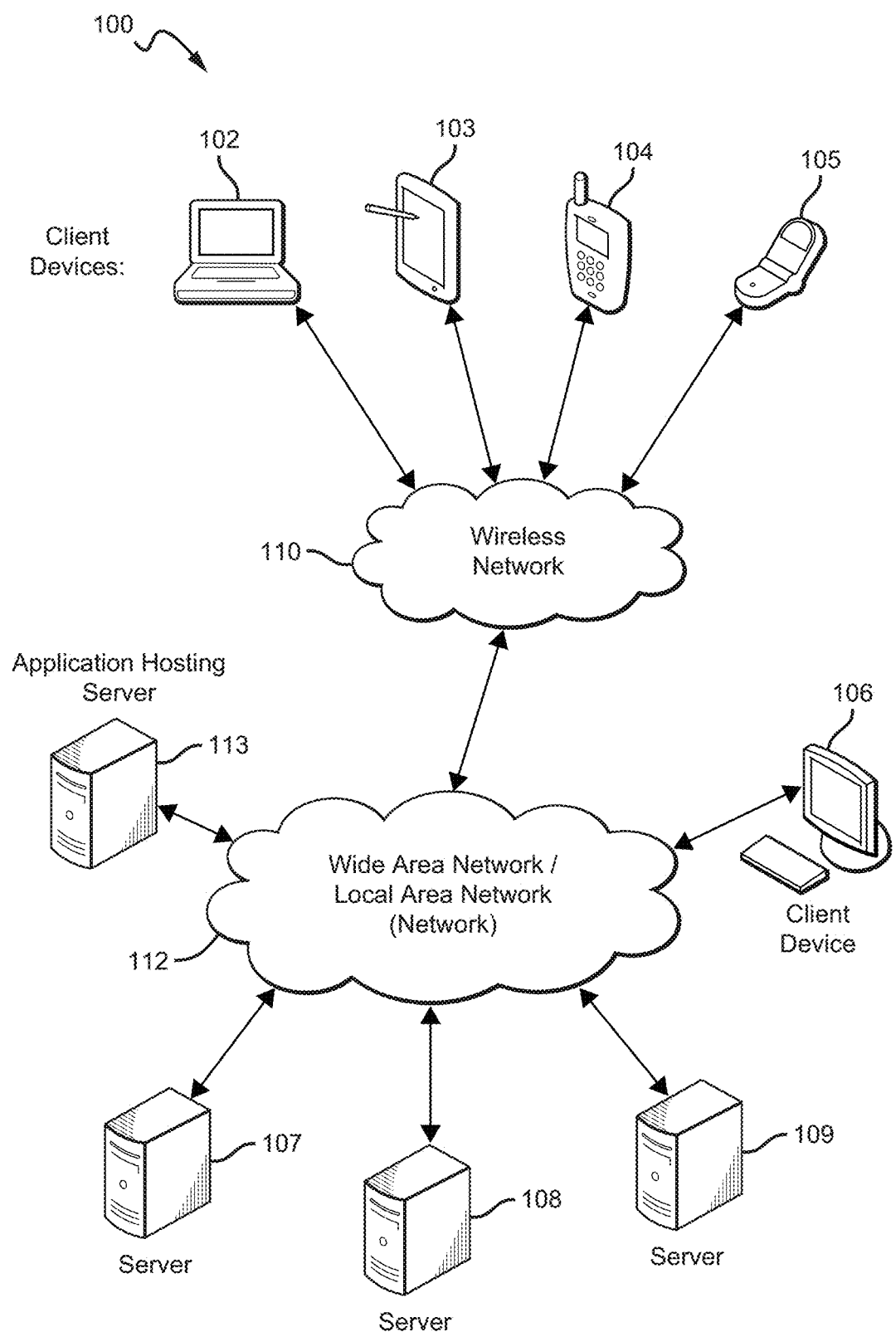
FIG. 1 shows an exemplary system architecture of the computers operating the lead generation platform.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE INVENTION

The present invention will now be described more fully hereinafter with reference to the accompanying drawings which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as devices or methods. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrases "in one embodiment," "in an embodiment," and the like, as used herein, does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

FIG. 1 illustrates components of one embodiment of an environment in which the invention may be practiced. Not all the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices 102-106 may include, for example, desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
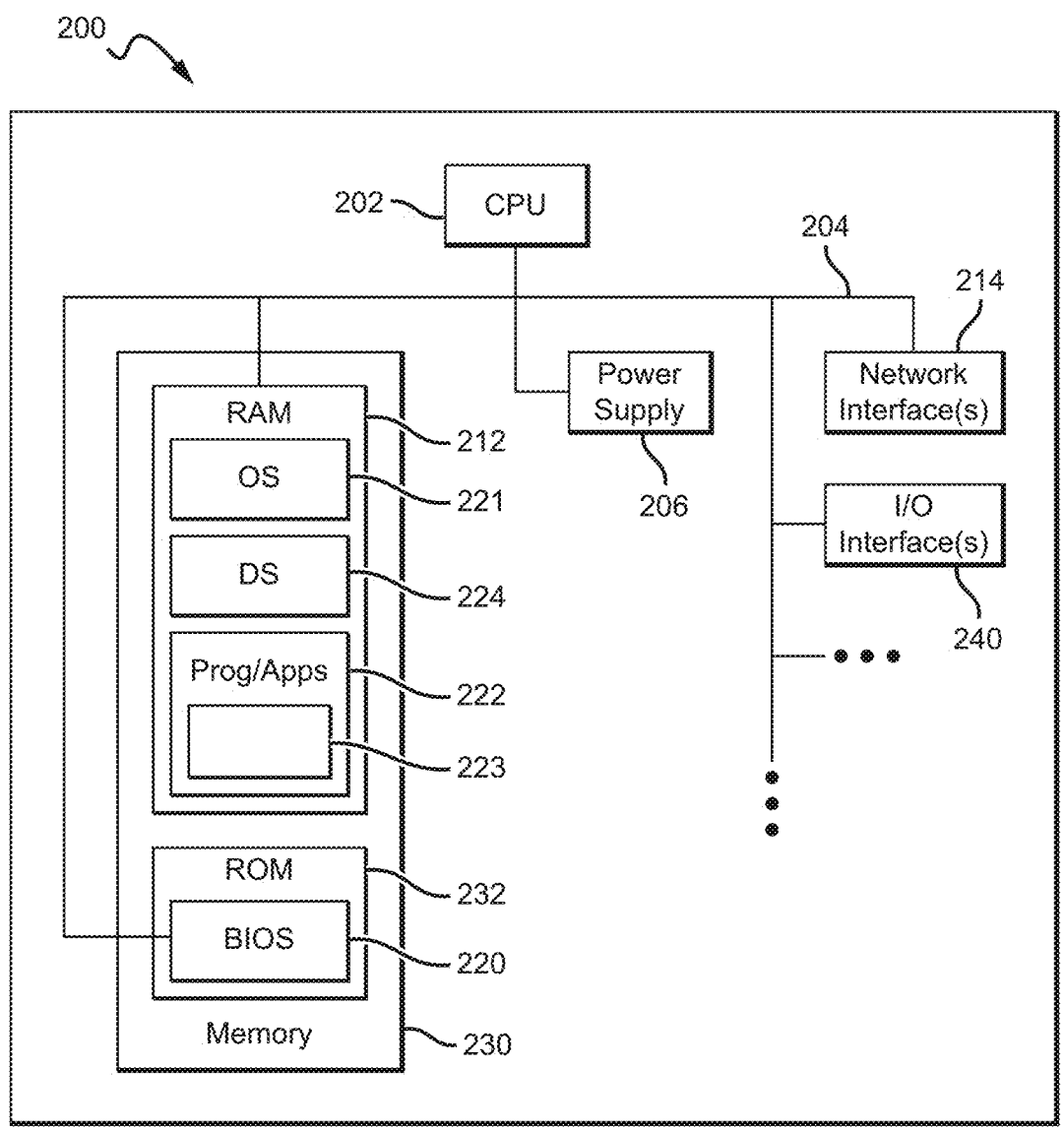
FIG. 2 shows an exemplary system architecture of the lead generation platform.

FIG. 2 illustrates a block diagram of an electronic device 200 that can implement one or more aspects of an apparatus, system and method for increasing yield and efficiency in advertising monetization programs (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UNITS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

As noted above, embodiments of the present invention, which may be implemented at least in part in the program 223, relate to apparatuses, methods and systems for increasing yield and efficiency in advertising monetization program. This may include the use of a neural network and, more specifically, a convolutional neural network.

An embodiment of the present invention, which may be implemented at least in part in the program 223, includes software that matches buyers and advertisers to high-quality and high-yield digital advertisements and leads.

Figure 3:
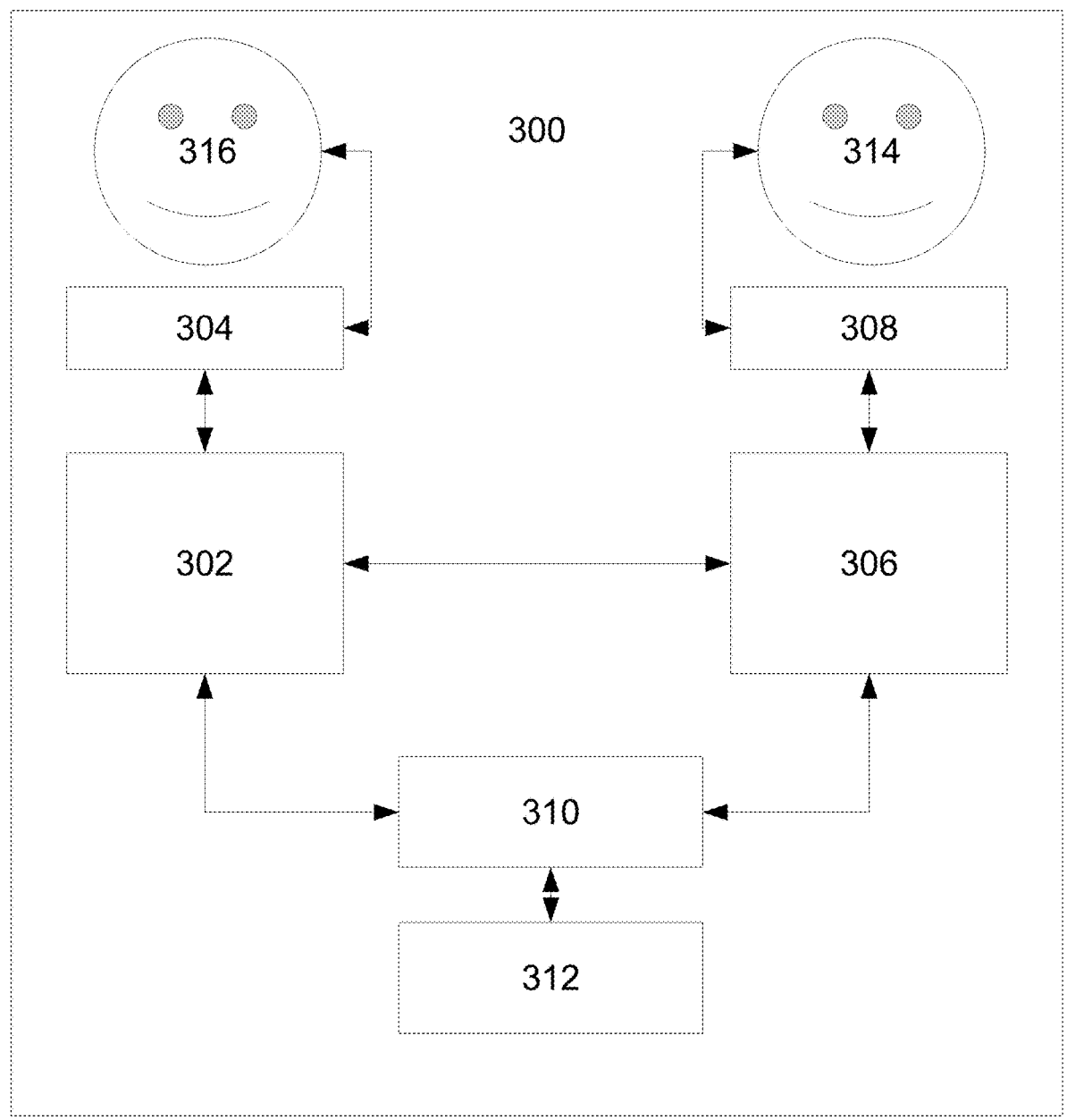
FIG. 3 shows an exemplary system architecture, including the interaction between the various sub-systems and interfaces.

As shown in FIG. 3, the advertising platform 300 includes an advertiser or seller sub-system 302 and interface 304, a buyer or purchaser sub-system 306 and interface 308, and a server sub-system 310 and database 312. Data may be relayed from the buyer sub-system to the advertiser sub-system and vice versa, either directly, or via the server sub-system. The buyer sub-system may be configured to handle requests from and be operated by business buyers 314, particularly e-commerce merchants and those in search of leads in various industries. The server sub-system may include a verification sub-system designed to verify the (customer) data uploaded by the advertiser, and a matching sub-system designed to match the (customer) data with traffic data obtained via a pixel acting on the buyer's website, all of which will be described below.

In certain embodiments, the pixel may detect IP address, geolocation, user agent, operating system, referrer, URI or other undisclosed information. The pixel may analyze real-time web traffic data to score against the growing database of leads that have opted into third party marketing efforts to find matches and generate advertising leads.

The advertiser sub-system may be configured to address the needs of advertisers 316 and those with data to sell for leads, particularly advertising and data agencies with particularized data to monetize. As such, the data may include customer data, which may include customer names, email addresses, phone numbers, identification of the device(s) used by the customers, IP addresses associated with the devices, and transactional history, such as whether or not and/or how close the customer came to making a purchase.

Figure 4A:
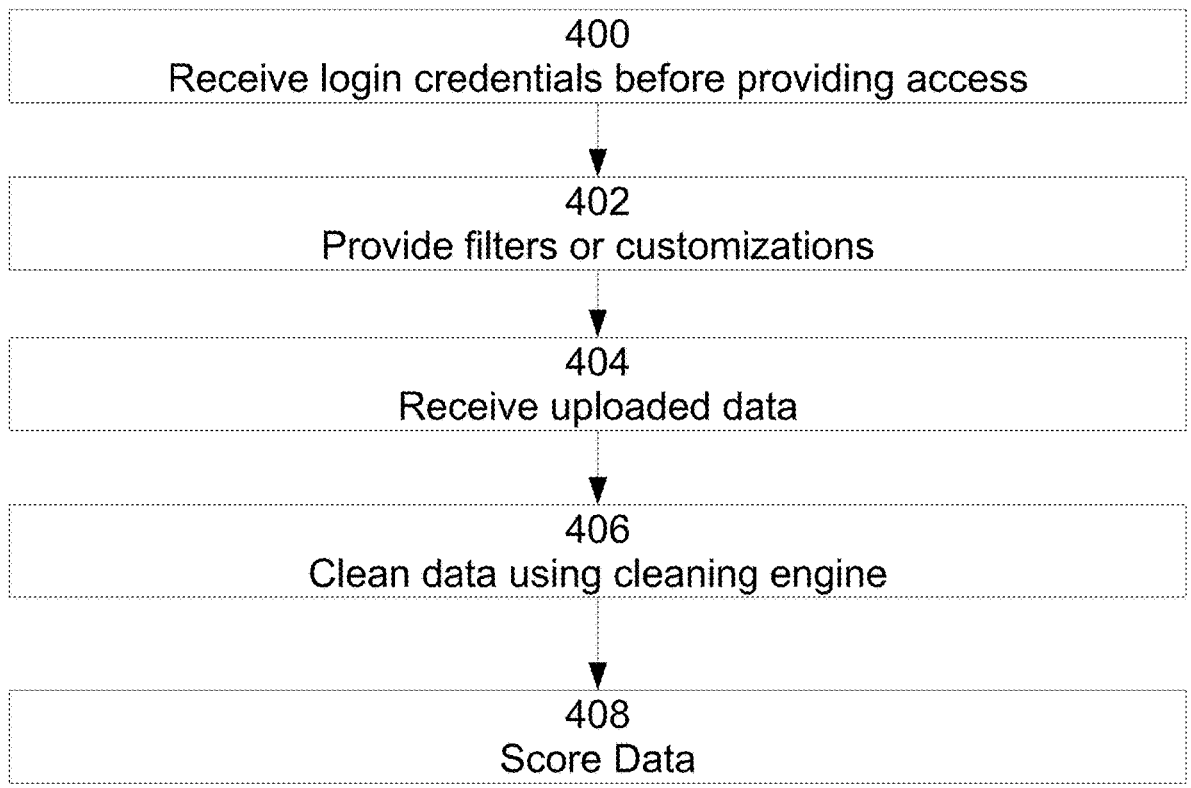
FIG. 4a shows an exemplary advertiser sub-system process.

As shown in FIG. 4A, the advertiser sub-system may receive advertiser login credentials 400. The advertiser may provide one or filters or customizations at 402, including detailing their data as a (i) lead; (ii) verified lead (such as, for example, a lead that has been cleaned and verified by a third-party system); or (iii) verified plus lead. In certain embodiments, a verified plus lead is someone who has been cleaned and verified as well as cross checked for revenue (purchase data) by a third-party system, or any other suitable lead, such as an aged lead.

The advertiser may upload data 404. The data may be any suitable data, such as lead generation data. The data may include names, addresses, email addresses, telephone numbers, locations, IP addresses, age information, financial or any suitable form of demographic information, shopping or purchasing preferences, such as preferred times of day, or any other suitable information. In certain embodiments, the data may include one or more customer records, and/or a profile associated with the customer records. The data may be stored in a database.

For example, a customer record may include an address and email, with an indication that the data is two years old.

At 406, the data may then be cleaned utilizing a cleaning engine. The cleaning system or engine may utilize one or more data feeds from the internet. The cleaning may then verify that the email associated with the record is actually in use around the internet. For example, a "dummy" email address that seems plausible or even in existence, such as patent@gmail.com, may be tested for use in circulation around the internet.

After the data is cleaned, the data may be scored at 408. After verifying it is a the address is a real and in use email, the record may be further scored based on other features such as matching IP, user agent, geolocation with the record, frequency of use, time active, or any other suitable feature. The record may then be given a grade, such as A-F, or 1-100, or any other suitable grade, based on the suitability. The data may then be offered for sale via the platform at 412.

Figure 4B:
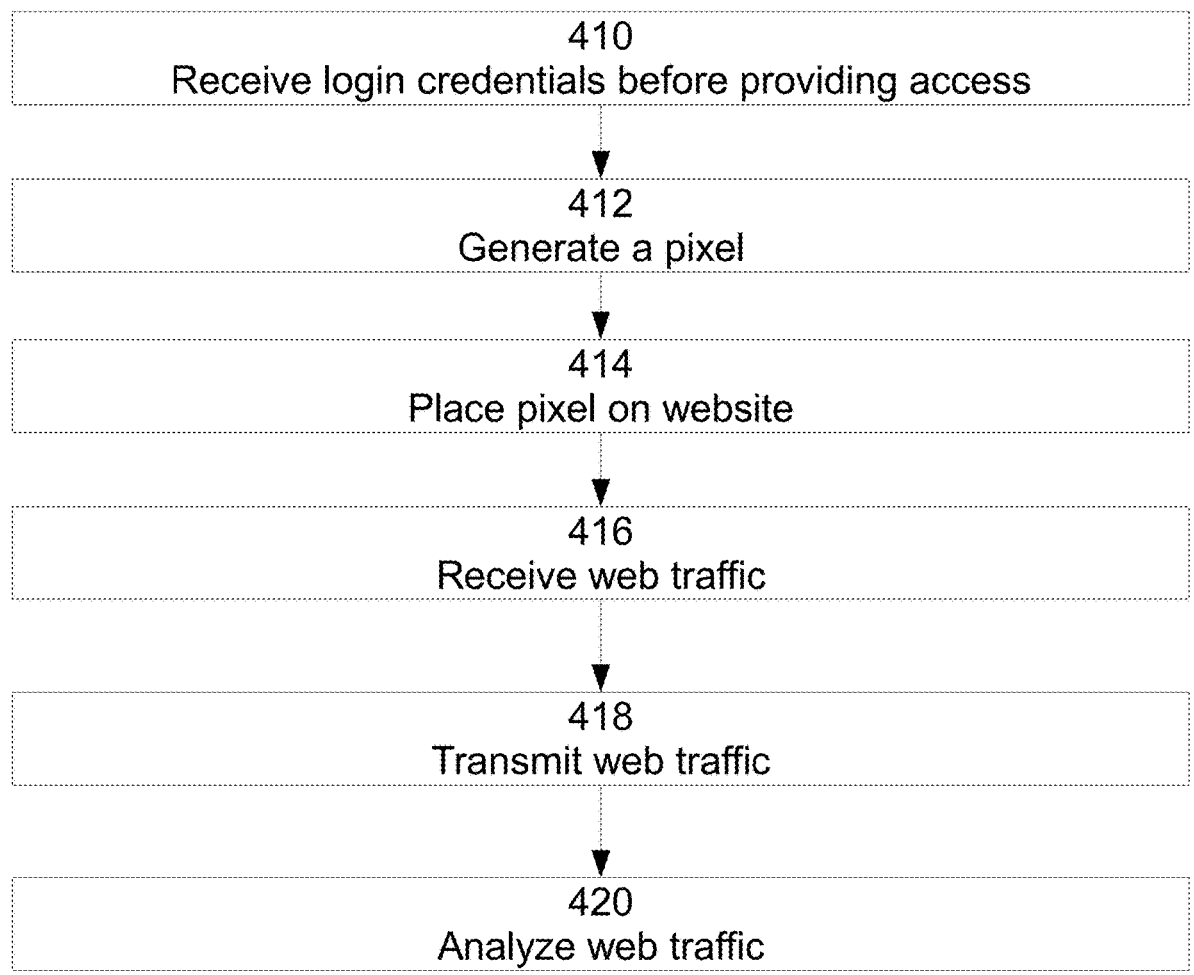
FIG. 4b shows an exemplary buyer sub-system process.

As shown in FIG. 4B, the buyer sub-system may receive user login credentials 410 to provide a buyer secure operational access to the platform. At 412, the buyer may generate a pixel for placement on a buyer's webpage 416. As used herein, webpage refers to a website, web address or any other suitable format of a site available over the internet or an intranet. The pixel may be installed as a snippet, such as a code snippet, and formed and saved in a sequence location so as not to interfere with webpage load time.

In accordance with certain embodiments, the pixel may be used to receive web traffic 416 and transmit web traffic 418 on the buyer website to server sub-system in real time. That is, a buyer's website may receive web traffic, such as visitors to its website and the web traffic may be analyzed via the server sub-system 420.

If the database finds one or more datapoints associated with the data in the database, received from an advertiser, a positive identification is triggered. The positive identification may then trigger an alert on the buyer sub-system 306 and 308. The alert may be a pop-up, color feature, or any other suitable alert. The alert may indicate the presence of a positive data lead.

The buyer may then initiate a transaction to purchase the data lead from the advertiser. In one embodiment, the data lead may be purchased by offering an advertiser a pre-arranged amount per lead. In certain embodiments, the buyer may offer any suitable or desired amount. In yet additional embodiments, the purchase price may be set by the platform, or via dynamic pricing.

In certain embodiments, various leads may be generated at any one time. The leads may be filtered based on date, location, number, or any other suitable value. The leads may filter based on the rating assigned to the lead, such as A, B, C, D or F.

Figure 5A:
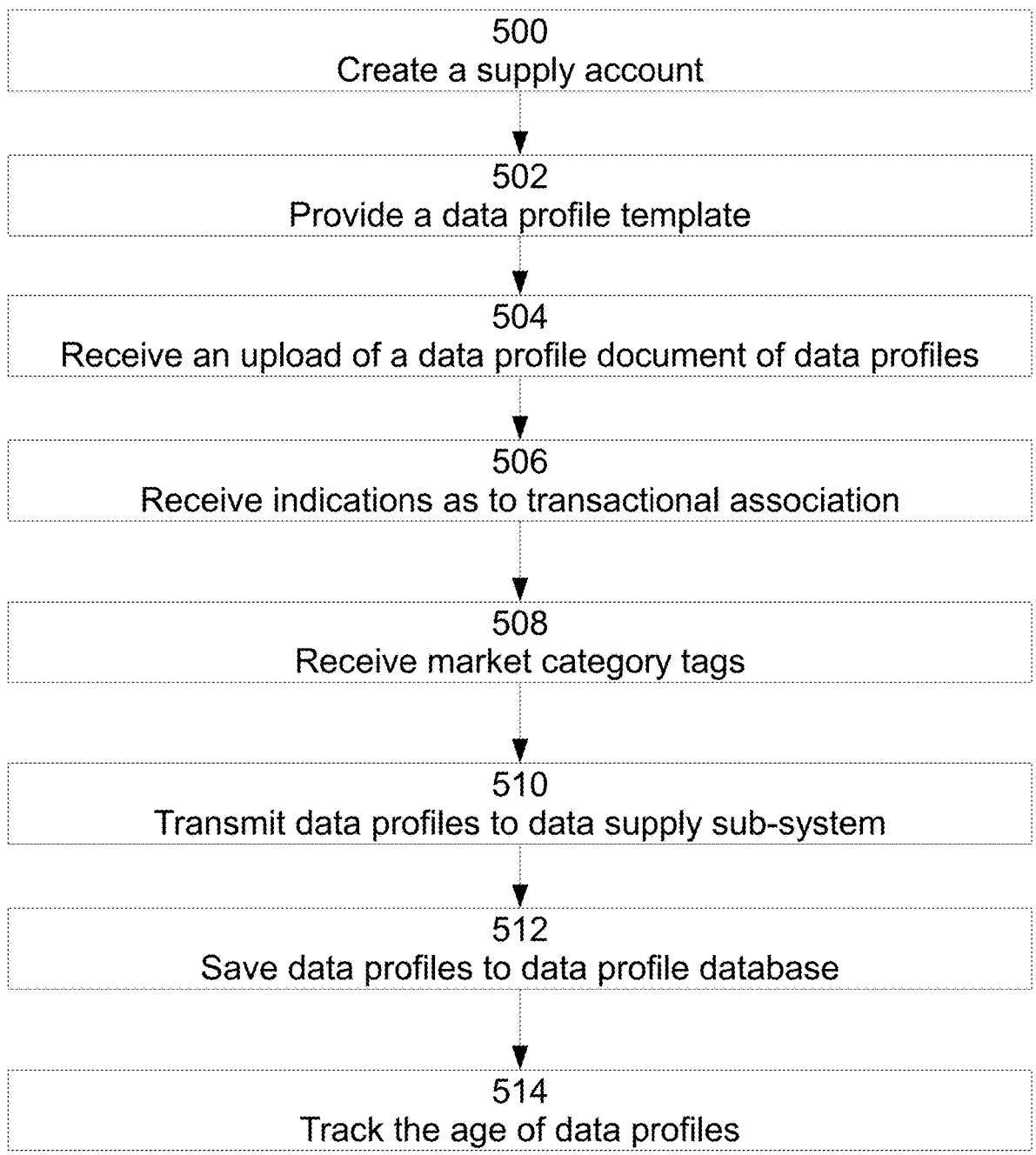
FIG. 5a shows an exemplary data supplier sub-system and interface process.
Figure 5B:
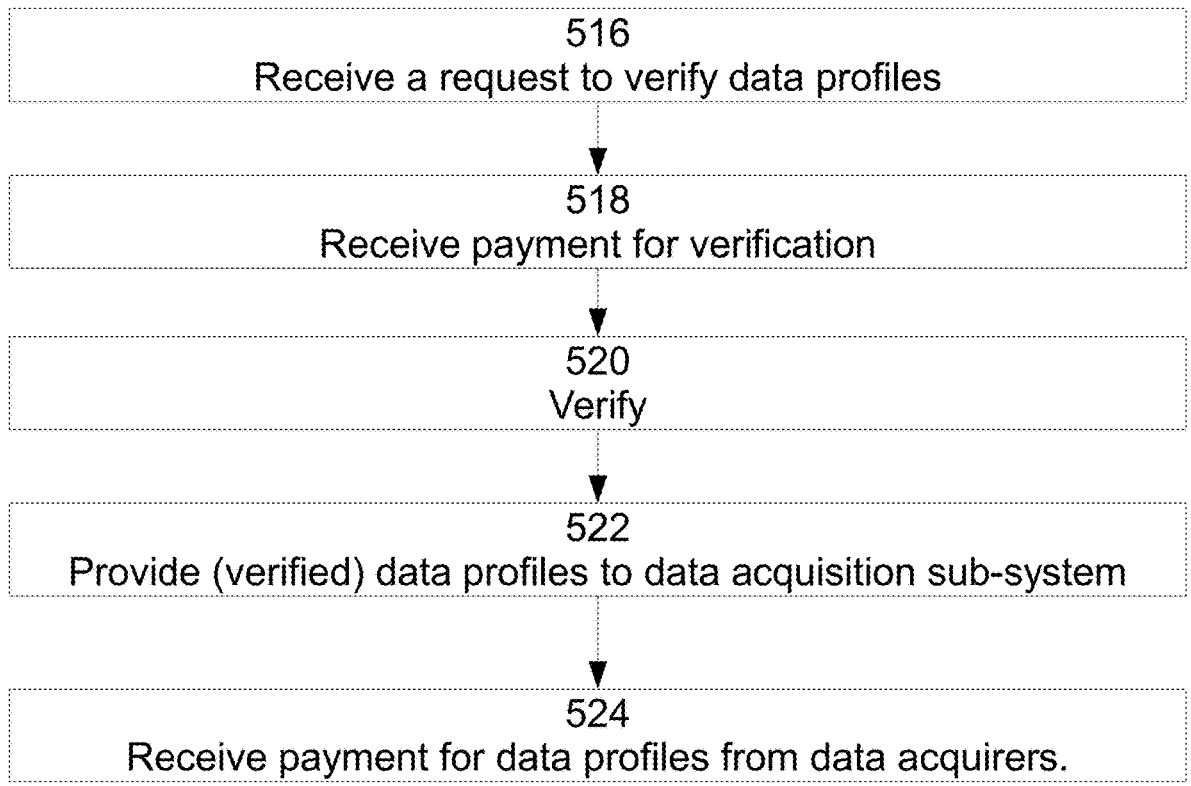
FIG. 5b shows a second exemplary data supplier sub-system and interface process.

As shown in FIGS. 5a-b, the data supply sub system may permit the data supplier to create a supply account 500, by entering various account credentials, such as a username, email address, and password. Then, it may provide the data supplier a data profile template 502 in order to assist the data supplier in entering or arranging their data, particularly as it pertains to customer data, into a document which may be read by the data supply sub-system. The template may identify the proper placement of customer data categories, such as the name of the customer, the type of device(s) the customer uses, identification information for those device(s), such as IP addresses, phone numbers, and emails, indications as to whether the customer purchased any goods or services, the category of those goods or services, the monetary amount of those purchases, and any additional information that would help in painting a complete picture of the customer's purchase habits, interests, and inclinations, provided that additional information could be easily formatted into a spreadsheet. The data supply sub-system may then receive an upload of the data profile document filled with data profiles 504. If the data supplier has not already done so, he or she may then submit and the system may receive indications as to whether the data profiles are associated with market transactions 506 and receive market category tags for the data profiles 508. Market category tags may identify the nature of transactions, such as the type of good or service transacted. For example, there may be a drop down menu adjacent to the document upload portion of the interface in which the data supplier may tag the submitted data profiles as pertaining to real estate, legal, or beauty and cosmetics, as the case may be. Accordingly, the data supplier may identify data profiles individually or in aggregate as described above.

The data profiles, upon being received by the data supply sub-system 510, may be saved to a data profile database 512 and tracked for their "age" based on when each data profile was added to the data profile database 514. The age may be updated in real time, or incrementally based on the number of days, weeks, months, or even years.

The data supply interface may receive a request from the data supplier 516 to verify selected data profiles, which the data verification sub-system may perform 520 upon receiving payment from the data supplier 518. Verification may involve the steps of comparing the data profiles with a separate database, such as a data profile database controlled by operators of the platform, or data profile databases filled with data profiles updated by other data suppliers. It is conceivable that, in certain embodiments, only a portion of the data profiles need to be verified in order to assume verification of the entire set of data profiles. As such, certain data profiles may be tested at random. Alternatively, or additionally, the data profiles may be verified by running them through an artificial intelligence program. The AI program may be an "expert system" or a neural network training in data profiles that were tagged as either "authentic" or "fabricated". Data profiles that pass the verification step may receive higher scores, as will be described later, and consequently demand higher prices. Data profiles that are not tested, do not pass the verification step, or pass it imperfectly, may be either rejected and deleted from the data profile database, receive a lower score, or simply be tagged as such, and may accordingly demand lower prices. A given set of data profiles may be scored based on the number of data profiles that pass as well as the number that do not pass and may consequently obtain a mixed score. Each data profile may be given its own score or may inherent the score of the data profile set as a whole.

After verification, or bypassing verification, the data supply sub-system may provide the data profiles to the data acquisition sub-system 522 for purchase by data acquirers 524. The data profiles may be displayed to the data acquires on the data acquisition interface as statistics, so that the data acquirer can select among the data profiles not on an individual basis—although in one variation that is permitted—but in groups sharing various attributes. For example, the data acquirer can purchase data profiles based on their price range, whether they are associated with transactions, whether they have a particular market transaction tag, the age, and so on.

Figure 6:
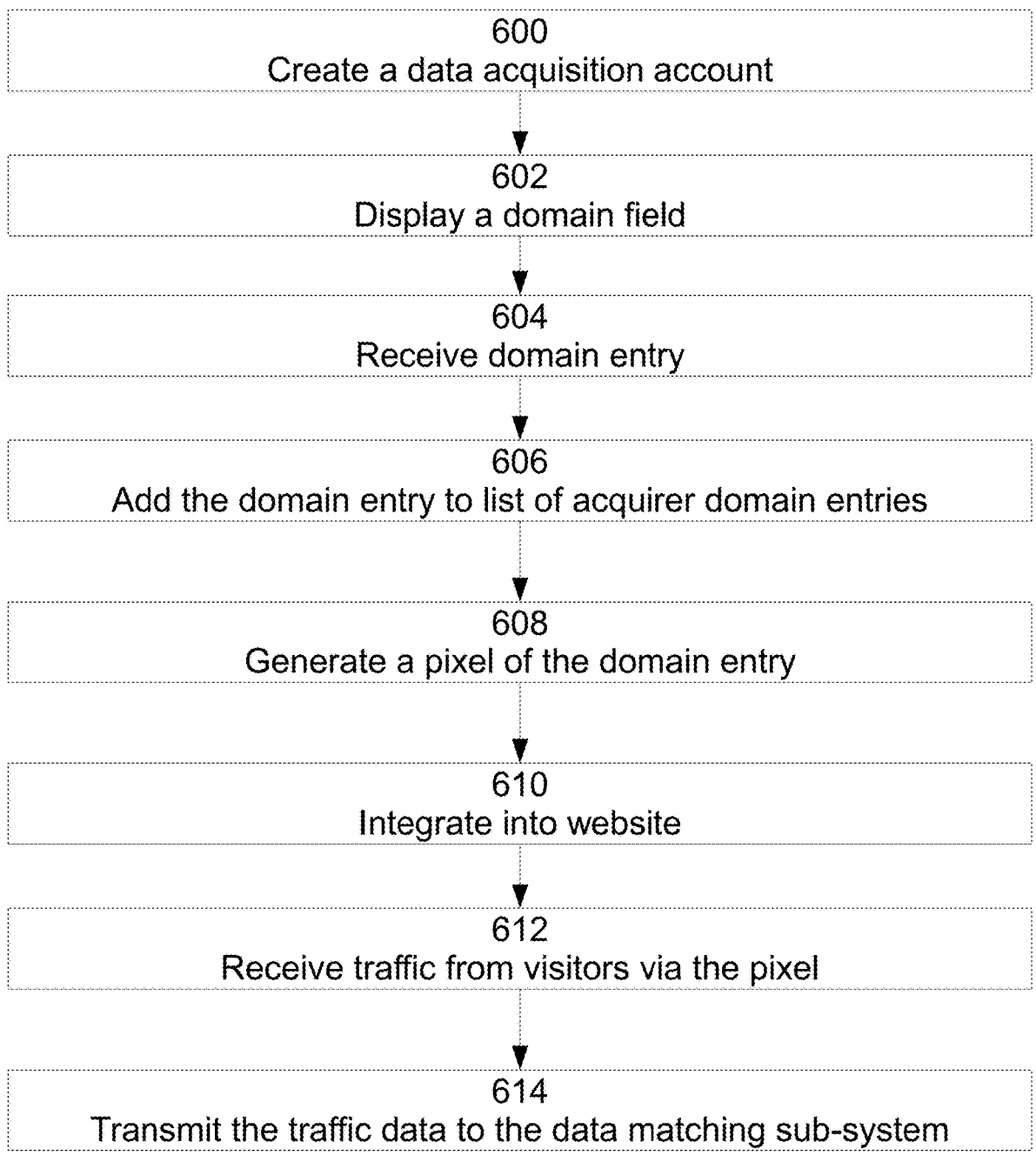
FIG. 6 shows an exemplary data acquisition sub-system and interface process.

As shown in FIGS. 6a-b, the data acquisition interface may permit the data acquirer to create a data acquisition account 600, similar to how the data supply interface permitted the data supplier to create a data supply account. Thereafter, the interface may display a domain field 602 for the data acquirer to submit and the data acquisition interface to receive a domain entry 604. The domain entry may be a domain name, such as www.murcury.io. The data acquisition interface may add the domain entry 606 to a list of domain entries belonging to that data acquirer. The data acquisition sub-system may permit the data acquirer to generate a pixel code 608, which is configured to be integrated into the website 610, thereby enabling a pixel to receive traffic data from visitors visiting the website 612 and transmit the traffic data to the data matching sub-system 614. The pixel code may be unique to a particular domain entity so as to prevent its use on any other website. The sub-system may require payment before the data acquirer generates or obtains the pixel code, and/or the sub-system may require payment based on the amount of traffic data transmitted to the sub-system because of the pixel. The pixel may be a widget easily added to a webpage's html header, footer, body, or other portion. Multiple pixels may be generated for the same website in order to capture and handle different aspects of traffic or traffic occurring on different pages of the same website.

Figure 7:
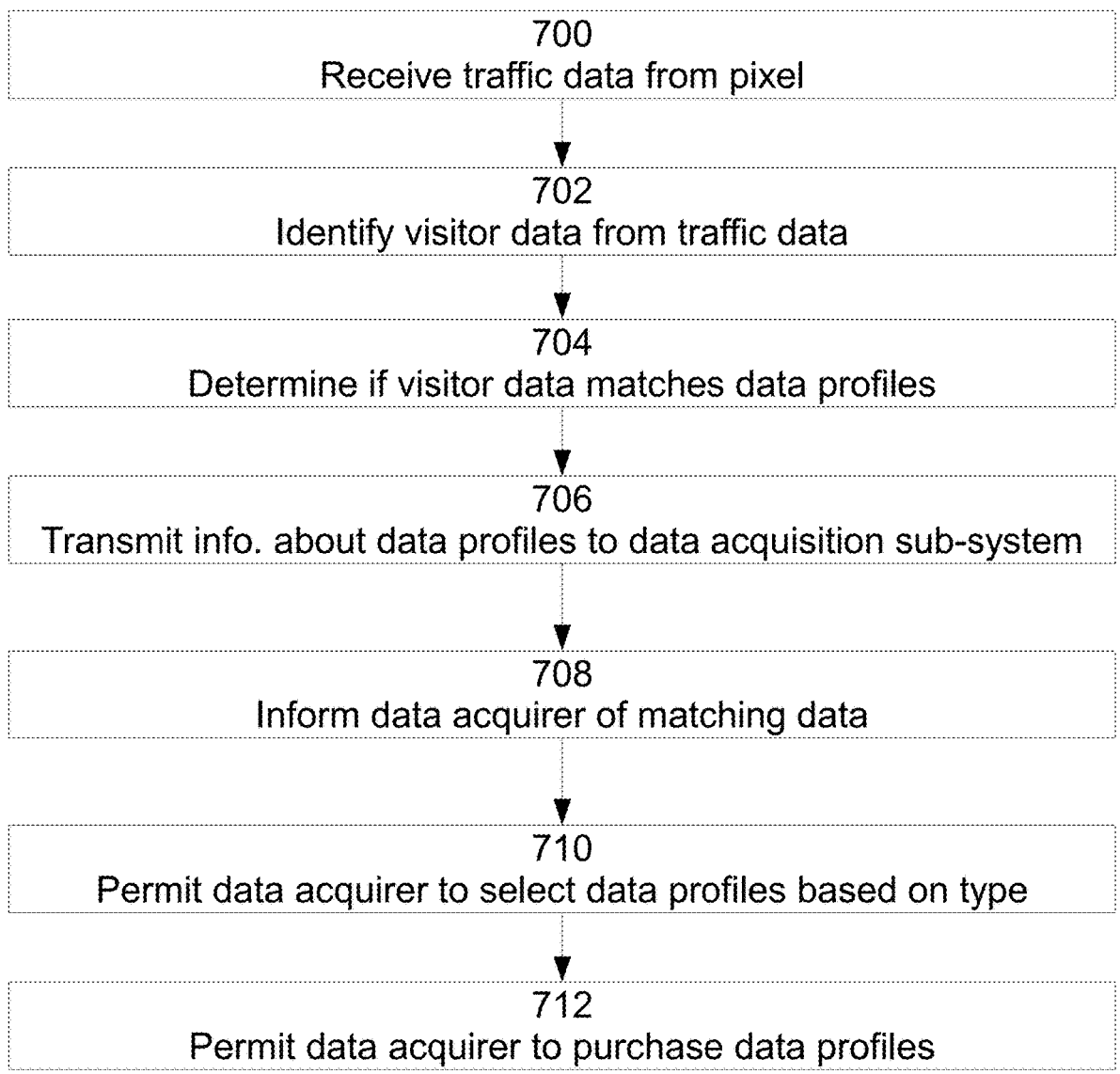
FIG. 7 shows exemplary data matching sub-system and data acquisition sub-system processes.

As shown in FIG. 7, the data matching sub-system may, in real time, receive the traffic data from the pixel 700, identify visitor data from the traffic data 702, determine if the visitor data matches data profiles in the data profile database 704, and if so, transmit information about the number and type of data profiles matching visitor data to the data acquisition sub-system 706. The receipt of the traffic data may be "raw" or organized by the pixel based on one or more attributes, such as the time at which a segment of traffic data occurred, grouped according to traffic data sharing a common IP address, or any other way in which traffic data may be ordered. Matching may occur by comparing the IP address in the traffic data to an IP address in the data profile database, or by matching some other attribute, such as contact information.

The matching sub-system may identify "mismatching" or "problematic" data if the traffic data matches many data profiles, suggesting that the same IP address may be used by multiple people. This mismatched or problematic data may be tagged, which may result in the deletion thereof or a change in the scoring.

Information about matching data profiles and traffic data and which is sent by the matching sub-system to the data acquisition sub-system may include all the data that is available with respect to the matching data profiles, or limited to the mere cognizance of their existence.

The data acquisition interface may thereafter be configured to inform the data acquirer of the data profiles matching visitor data for each domain entity 708 and permit the data acquirer to select 710 and purchase 712 those data profiles based on the type, i.e., whether they are associated with market transactions or not, as was described previously.

A data supply, verification, matching, and acquisition platform may comprise a data supply sub-system and interface, a data verification sub-system, a data matching sub-system, and a data acquisition sub-system and interface. The data supply sub-system and interface may be configured to be accessed and used by a data supplier. The data supply interface may be configured to permit the data supplier to create a data supply account with the data supply sub-system.

The data supply interface may be configured to provide a data profile template to the data supplier, receive an upload from the data supplier of a data profile document filled with data profiles, receive an indication from the data supplier indicating whether or not the data profiles are associated with transpired market transactions, receive market category tags for the data profiles from the data supplier, and transmit the data profiles to the data supply sub-system. The data profile template may be a spreadsheet.

The data supply sub-system may be configured to save the data profiles to a data profile database and track the age of each data profile based on when each data profile was added to the data profile database. The data supply interface may be configured to receive requests and payment from the data supplier to verify selected data profiles and transmit the verification request for the selected data profiles to the data verification sub-system. The data supply sub-system may be configured to make the data profiles available to users of the data acquisition sub-system for a price which is paid at least in part to the data supplier.

The data profiles may have a device category, the device category identifying whether each data profile is associated with a desktop computer, tablet device, or mobile phone device. The data profiles may have contact cells which store phone numbers and/or emails. The data profiles may have IP address cells which store IP addresses.

The data acquisition sub-system and interface may be configured to be accessed and used by a data acquirer. The data acquisition interface may be configured to permit the data acquirer to create a data acquisition account with the data acquisition sub-system, display a domain field, receive a domain entry from the data acquirer for a website operated by the data acquirer, and add the domain entry to a list of domain entries belonging to that data acquirer.

The data acquisition sub-system may be configured to permit the data acquirer to generate a pixel code, the pixel code configured to be integrated into the website and to enable pixel software to automatically receive traffic data from visitors visiting the website. The pixel software may be configured to transmit the traffic data to the data matching sub-system.

The data matching sub-system may be configured to, in real-time, receive the traffic data from the pixel software, identify visitor data from the traffic data, determine if the visitor data match data profiles in the data profile database, and transmit information about the number and type of data profiles matching visitor data to the data acquisition sub-system.

The data acquisition interface may be configured to inform the data acquirer of the data profiles matching visitor data for each domain entry and permit the data acquirer to select and purchase data profiles matching visitor data according to their type.

The data acquisition sub-system may be configured to generate documents of purchased data profiles and to enable the data acquirer to access and download the documents of purchased data profiles via the data acquisition interface.

Each data profile may correspond to a potential online customer and contact information for the potential online customer. The transpired market transactions may be purchases made by online customers and the data profiles may be information about those online customers.

The data supplier and the data acquirer may not be mutually exclusive and separate users, or they may be the same user. The data acquirer may be an e-commerce merchant.

The data verification sub-system may be configured to determine using a neural network whether a given data profile accurately describes an online customer or is merely a fabrication, the neural network having been trained on both authentic and fabricated data profiles.

The data acquisition interface may be configured to require the data acquirer to submit credentials for a given domain entry before adding the given domain entry to the list of domain entries owned by the data acquirer.

The data verification sub-system and the data matching sub-system forming part of a server sub-system.

A customer data monetization platform may be configured to be accessed and used by a customer data seller, receive customer data from the customer data seller, save the customer data to a customer data database, and make the customer data available for purchase. The platform may be accessed and used by a customer data purchaser, generate a pixel code configured to be integrated with a website belonging to the customer data purchaser, receive traffic data from pixel software associated with the pixel code, determine if the traffic data matches any of the customer data, and permit the customer data purchaser to purchase matching customer data.

The platform may be configured to verify the customer data, or may require payment from the customer data seller prior to verification.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A data supply, verification, matching, and acquisition platform, comprising a data supply sub-system and interface, a data verification sub-system, a data matching sub-system, and a data acquisition sub-system and interface;
    a) the data supply sub-system and interface configured to be accessed and used by a data supplier;
        i) the data supply interface configured to permit the data supplier to create a data supply account with the data supply sub-system;
        ii) the data supply interface configured to provide a data profile template to the data supplier, receive an upload from the data supplier of a data profile document filled with data profiles, receive an indication from the data supplier indicating whether or not the data profiles are associated with transpired market transactions, receive market category tags for the data profiles from the data supplier, and transmit the data profiles to the data supply sub-system;
        iii) the data supply sub-system configured to save the data profiles to a data profile database and track aging of each data profile based on when each data profile was added to the data profile database;
        iv) the data supply interface configured to receive requests and payment from the data supplier to verify selected data profiles and transmit the verification request for the selected data profiles to the data verification sub-system;
        v) the data supply sub-system configured to make the data profiles available to users of the data acquisition sub-system for a price which is paid at least in part to the data supplier;
        vi) the data profiles having a device category, the device category identifying whether each data profile is associated with a desktop computer, tablet device, or mobile phone device;
        vii) the data profiles having contact cells which store phone numbers and/or emails;
        viii) the data profiles having IP address cells which store IP addresses;
    b) the data acquisition sub-system and interface configured to be accessed and used by a data acquirer,
        i) the data acquisition interface configured to permit the data acquirer to create a data acquisition account with the data acquisition sub-system, display a domain field, receive a domain entry from the data acquirer for a website operated by the data acquirer, and add the domain entry to a list of domain entries belonging to that data acquirer;
        ii) the data acquisition sub-system configured to permit the data acquirer to generate a pixel code, the pixel code configured to be integrated into the website and to enable pixel software to automatically receive traffic data from visitors visiting the website;
        iii) the pixel software configured to transmit the traffic data to the data matching sub-system;
    c) the data matching sub-system configured to, in real-time, receive the traffic data from the pixel software, identify visitor data from the traffic data, determine if the visitor data match data profiles in the data profile database, and transmit information about the number and type of data profiles matching visitor data to the data acquisition sub-system;
    d) the data acquisition interface configured to inform the data acquirer of the data profiles matching visitor data for each domain entry and permit the data acquirer to select and purchase data profiles matching visitor data according to their type;
    e) the data acquisition sub-system configured to generate documents of purchased data profiles and to enable the data acquirer to access and download the documents of purchased data profiles via the data acquisition interface; and
    f) the data verification sub-system configured to determine using a neural network whether a given data profile accurately describes an online customer or is merely a fabrication, the neural network having been trained on both authentic and fabricated data profiles.

2. The data supply, verification, matching, and acquisition platform of claim 1, with the data profile template being a spreadsheet.

3. The data supply, verification, matching, and acquisition platform of claim 1, with each data profile corresponding to a potential online customer and contact information for the potential online customer.

4. The data supply, verification, matching, and acquisition platform of claim 1, with the data supplier and the data acquirer not being mutually exclusive.

5. The data supply, verification, matching, and acquisition platform of claim 1, with the data supply account and the data acquisition account not being mutually exclusive.

6. The data supply, verification, matching, and acquisition platform of claim 1, with the data supply account and the data acquisition account being mutually exclusive.

7. The data supply, verification, matching, and acquisition platform of claim 1, with the transpired market transactions being purchases made by online customers and the data profiles being information about those online customers.

8. The data supply, verification, matching, and acquisition platform of claim 1, with the data acquisition interface configured to require the data acquirer to submit credentials for a given domain entry before adding the given domain entry to the list of domain entries owned by the data acquirer.

9. The data supply, verification, matching, and acquisition platform of claim 1, with the data verification sub-system and the data matching sub-system forming part of a server sub-system.

10. The data supply, verification, matching, and acquisition platform of claim 1, with the data acquirer being an e-commerce merchant.

\* \* \* \* \*